(12) United States Patent
Samokhin et al.

(10) Patent No.: US 8,725,411 B2
(45) Date of Patent: May 13, 2014

(54) 3D TUNNEL REPRESENTATION

(75) Inventors: Viktor Samokhin, Ovidiopol (UA);
Vladimir Ivanov, Munich (DE); Martin Fischer, Munich (DE);
Carsten-Christian Spindler, Karlsruhe (DE); Stavros Mitrakis,
Kirchheim-Heimstetten (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 13/571,960

(22) Filed: Aug. 10, 2012

(65) Prior Publication Data

US 2013/0041583 A1 Feb. 14, 2013

(30) Foreign Application Priority Data

Aug. 11, 2011 (EP) ..................................... 11177261

(51) Int. Cl.
*G01C 21/00* (2006.01)
*G06T 15/00* (2011.01)

(52) U.S. Cl.
USPC .......................................... 701/436; 345/419

(58) Field of Classification Search
USPC ......................... 701/428, 400, 411, 436, 422;
340/995.1, 995.2, 995.24; 345/419,
345/628, 653, 664
See application file for complete search history.

(56) References Cited

U.S. PATENT DOCUMENTS

2001/0028350 A1 10/2001 Matsuoka et al.
2006/0074547 A1* 4/2006 Kaufman et al. ............. 701/200

FOREIGN PATENT DOCUMENTS

| JP | 2010025741 | 2/2010 |
| WO | 2009128585 | 10/2009 |
| WO | WO 2009-128585 | * 12/2009 |

* cited by examiner

*Primary Examiner* — Muhammad Shafi
(74) *Attorney, Agent, or Firm* — O'Shea Getz P.C.

(57) ABSTRACT

The invention relates to system and method for generating a 3-dimensional representation of a tunnel. Road network data is provided having a plurality of road segments, at least one road segment being a tunnel road segment, including the information that said at least one road segment is a road segment located in a tunnel. The tunnel segment in the road network is identified, providing a geographical elevation map including elevation data of the geographical region in which the tunnel road segment is located, providing predefined patterns representing predefined parts of a 3-dimensional tunnel body, generating the 3-dimensional representation of the tunnel based on the tunnel road segment, the elevation map and the predefined patterns, and storing the 3-dimensional representation of the tunnel in connection with the road network as a 3-dimensional object which is located at the geographical position of the tunnel road segment.

17 Claims, 5 Drawing Sheets

3D TUNNEL REPRESENTATION

CLAIM OF PRIORITY

This patent application claims priority from EP Application No. 11 177 261.2 filed Aug. 11, 2011, which is hereby incorporated by reference.

FIELD OF TECHNOLOGY

The present invention relates to the field of navigation systems, and in particular to generating a 3-dimensional representation of a tunnel and displaying 3-dimensional route guidance information.

RELATED ART

Navigation systems are known that provide driving recommendations to a user. Navigation systems are used either for recommending a route to a predefined destination, or may be used by the driver to simply display the present position of the vehicle in a road network. Often a 2D map representation is shown to the user where the road network is shown with the present position of the vehicle, the road segment on which the user is presently located being highlighted. If a route to a predefined destination has been calculated, driving recommendations are given to the user, e.g., by highlighting the recommended route on the 2D representation of the road network.

In recent years, the use of a 3-dimensional representation of navigation information has become more popular. In this context the vehicle surroundings are displayed to the user using a 3-dimensional representation of the displayed objects. This 3-dimensional representation helps the user to better identify a route to be taken, as the 3-dimensional representation is more easily matched with the real world view by the user. For displaying the 3-dimensional vehicle surroundings, pre-stored 3-dimensional objects are inter alia used to generate the 3-dimensional view of the displayed information.

The road network can contain tunnels, however the road network data provided by map data suppliers normally do not contain a 3-dimensional representation of a tunnel.

Accordingly, a need exists to be able to include a 3-D tunnel representation into the displayed geographical area using the map data which are normally provided in a navigation system. Thus, a need exists to be able to easily generate a 3-dimensional representation of a tunnel.

SUMMARY OF THE INVENTION

According to a first aspect of the invention, a method for generating a 3-dimensional representation of a tunnel is provided, the method comprising the step of providing road network data including a plurality of road segments. Furthermore, the road network data contain the information that at least one road segment is a tunnel road segment, including the information that the at least one road segment is a road segment located in a tunnel. This tunnel road segment is identified in the road network data. Furthermore a geographical elevation map is provided including elevation data of the geographical region in which the tunnel road segment is located. In addition to the geographical elevation map predefined patterns are provided representing predefined parts of a 3-dimensional tunnel body. Based on the tunnel road segment, the elevation map and the predefined patterns the 3-dimensional representation of the tunnel is generated. This 3-dimensional representation of the tunnel can then be stored in connection with the road network as a 3-dimensional object, which is located at the geographical position of the tunnel road segment. The above described method allows generating of a 3-dimensional representation of a tunnel in an way using the information provided in a navigation system, i.e., the tunnel road segment and the geographical elevation map. With the use of predefined patterns a realistic 3-dimensional representation of the tunnel can be generated and stored as 3D object. This 3D object can be used later on for a 3D representation of the tunnel in a 3D driving recommendation.

The predefined patterns may contain a left and a right tunnel wall. The 3-dimensional representation of the tunnel may be generated using the tunnel road segment, the left tunnel wall and the right tunnel wall.

Furthermore, it is possible that each tunnel wall contains, at its upper end, a curved surface, the curved surfaces of the left and right tunnel wall building a tunnel ceiling. The 3-dimensional representation of the tunnel may contain a tunnel ceiling. However, it is also possible that the tunnel ceiling is omitted in the 3-dimensional representation to provide a better outside view of the tunnel.

Sometimes tunnels, especially tunnels located in a mountain have an entrance and/or exit portal. The predefined patterns may also contain an entrance and/or an exit portal of the tunnel and this entrance and/or exit portal may also be used when generating the 3-dimensional representation of the tunnel.

When generating the 3-dimensional representation of the tunnel, the representation of the tunnel may be stored in relation to the geographical surroundings. By way of example, the 3-dimensional representation of the tunnel can be generated by generating a 3-dimensional tunnel body including the tunnel road segment and the tunnel walls. This tunnel body is then embedded in the elevation map below a surface of the Earth. The 3-dimensional representation is then a 3D dataset showing the 3D tunnel body embedded in its geographical surroundings.

In this context it is possible that the 3-dimensional tunnel body is generated in such a way that the tunnel ceiling is omitted from the 3-dimensional body. In this embodiment, the side walls of the tunnel extend from the tunnel bottom, i.e., the tunnel road segment, to the surface of the Earth. However, it should be understood that the 3-dimensional tunnel body may also be generated including the tunnel ceiling.

When the tunnel body is embedded below a surface of the Earth, the position of the tunnel body below the surface of the Earth may be determined by elevation data of a tunnel entrance and a tunnel exit. The tunnel exit and the tunnel entrance may not be located at the same elevation. However, when the elevation of the tunnel entrance and the tunnel exit are known, the tunnel road segment located between the entrance and the exit can be positioned relative to the surface of the Earth.

Furthermore, it is possible that the right and the left tunnel wall are identified for each driving direction in the tunnel and that the identified left and right tunnel walls are stored for each driving direction in the 3-dimensional representation of the tunnel. The identification of the left and right side walls help to improve the representation of the tunnel, e.g., when an internal 3-dimensional view of the tunnel is generated.

The invention furthermore relates to a system configured to generate the 3-dimensional representation of the tunnel, containing a database containing road network data including a plurality of road segments, at least one of the road segments being a tunnel road segment. The database contains an elevation map including elevation data of the geographical region in which the tunnel road segment is located. Furthermore, the predefined patterns are provided representing the predefined shapes of the 3-dimensional tunnel body. This system furthermore contains a data processing unit that identifies the tunnel road segment in the road network and generates the 3-dimensional representation of the tunnel based on the tunnel road segment, the elevation map, and the predefined patterns. The data processing unit is configured to store the 3-dimensional representation of the tunnel in the database in connection with the road network as a 3-dimensional object which is located at the geographical position of the tunnel road segment. The data processing unit may generate the 3-dimensional representation and the 3D tunnel body as described above.

The invention furthermore relates to a method for displaying a 3-dimensional route guidance information to a user of a navigation system, the method comprising the step of determining a route along which the user is moving. Furthermore, a road segment is identified as a tunnel road segment, the tunnel road segment being a segment including the information that the road segment is located in a tunnel. Furthermore, a 3-dimensional representation of the tunnel is generated, the 3-dimensional representation of the tunnel being generated based on the tunnel road segment, the elevation map, and the predefined patterns representing predefined parts of the 3-dimensional tunnel body. Furthermore, the 3-dimensional route guidance information is displayed, the displayed information including a 3-dimensional representation of at least a section of the route and including the 3-dimensional representation of the tunnel.

Preferably, this 3-dimensional representation of the tunnel is generated by retrieving the 3-dimensional representation from a database where the 3-dimensional representation is stored as a 3-dimensional object. In this embodiment the method uses pre-stored objects provided in the database in connection with the road network data. Furthermore, it is possible that the 3-dimensional representation is generated as discussed above, when the 3-dimensional route guidance information is generated for display.

In the 3D representation of the route guidance information the tunnel may be shown as 3D object. However, if the displayed geographical region contains several tunnels, it may be beneficial not to display the 3D tunnels in the displayed image in order to improve the clarity of the displayed information. Thus, the 3D representation of the tunnel may only be shown in the route guidance information when the geographical region displayed as 3-dimensional route guidance information is smaller than a predefined threshold region.

The invention furthermore relates to a navigation system displaying the 3-dimensional route guidance recommendations as mentioned above. The system contains a route guiding module to determine a route along which the user is moving and configured to identify a road segment as a tunnel road segment. Furthermore, an image viewer is provided configured to generate the 3-dimensional representation of the tunnel. The navigation system contains a display configured to display the 3-dimensional route guidance information including the 3-dimensional representation of the tunnel. The image viewer may retrieve the stored 3-dimensional object showing the 3D representation of the tunnel and may include it into the displayed 3D route guidance information.

These and other objects, features and advantages of the present invention will become apparent in light of the detailed description of the best mode embodiment thereof, as illustrated in the accompanying drawings. In the figures, like reference numerals designate corresponding parts.

DETAILED DESCRIPTION OF THE INVENTION

Figure 1:
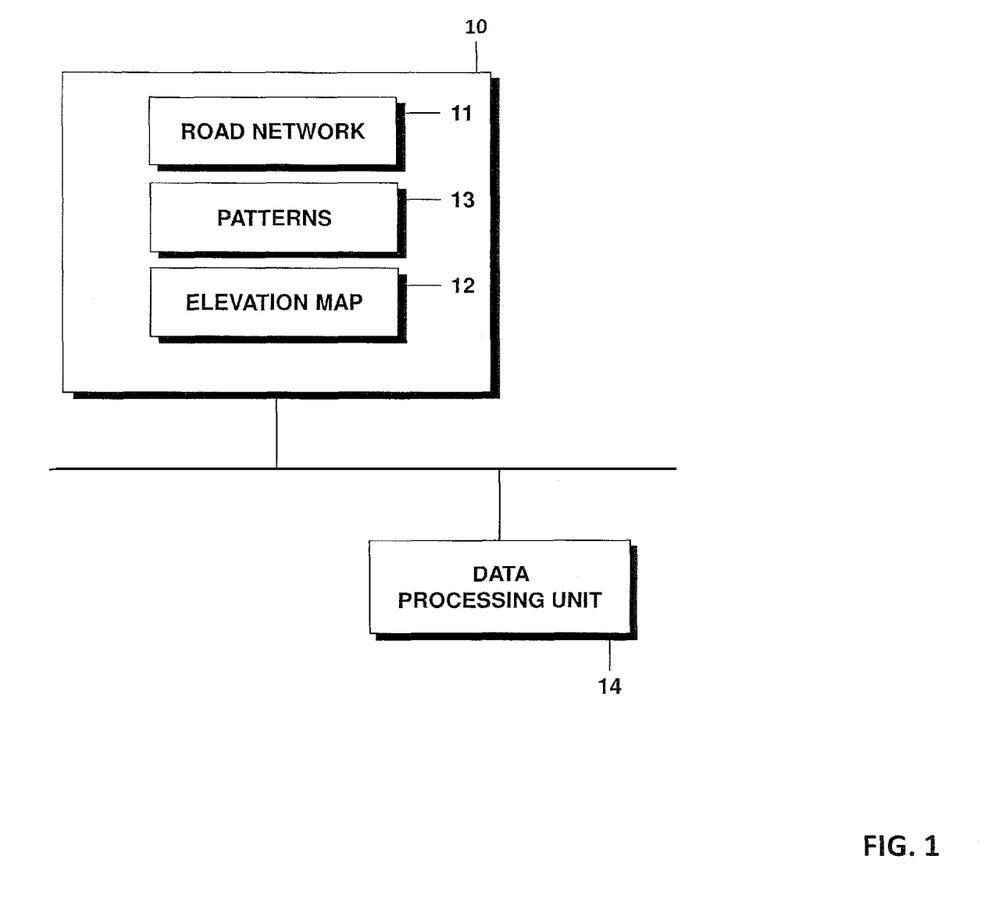
FIG. 1 is a schematic view of a system generating a 3-dimensional representation of a tunnel.

FIG. 1 is a block diagram illustration of a system that can be used to generate a 3-dimensional representation of a tunnel using map data including a road network and using predefined patterns corresponding to predefined parts of a 3-dimensional tunnel body.

The system shown in FIG. 1 contains a database 10 in which road network data 11 are stored. The road network data may be data as supplied by road network supplying companies, which comprise the road network of a geographical region. The road network data 11 normally do not contain 3-dimensional objects such as 3-dimensional representation of buildings, famous points of interest or tunnels. In the database 10 furthermore elevation map data 12 are provided including elevation or height data of the geographical region shown in the road network data 11. The road network data 11 are shown separated from the elevation map data 12. However, it should be understood that the road network data may be a data set containing, in addition to the road map data, digital elevation information. In this embodiment the road network data 11 contain for the different road segments an elevation information allowing to determine at which vertical height above sea level the corresponding road segment is located. The database furthermore contains predefined patterns 13 representing predefined parts of a 3-dimensional tunnel body. By way of example, the predefined patterns can contain wall segments building a left and right tunnel wall. The patterns may also contain for each of the tunnel walls, an upper curved surface so that when two tunnel walls are put together, the curved surfaces of the two tunnel walls build a tunnel ceiling. By way of example, the upper end of the tunnel wall may be shaped as a quarter of a circle. The patterns may also contain predefined 3-dimensional representation of entrance or exit portals of the tunnel that can be added when the 3-dimensional tunnel body is generated.

A data processing unit 14 generates the 3-dimensional representation of the tunnel using the data in the database 10. The data processing unit 14 is configured to generate the tunnel body by identifying the road segment in the road network data, which include the information that it is a tunnel road segment. This tunnel road segment with its given curvature is used together with the predefined wall sections stored in the patterns 13 to generate the 3-dimensional tunnel body. This tunnel body is then placed in its geographical environment by placing the tunnel body below the surface of the Earth. With the use of the elevation map and the road network data it is furthermore possible to determine the elevation of tunnel entrance and the tunnel exit. The data processing unit 14 then places the 3-dimensional tunnel body in the elevation map data in such a way that the road entering the tunnel is continued by the 3-dimensional tunnel body including the tunnel road segment, the road exiting the tunnel at the tunnel exit.

Figure 2:
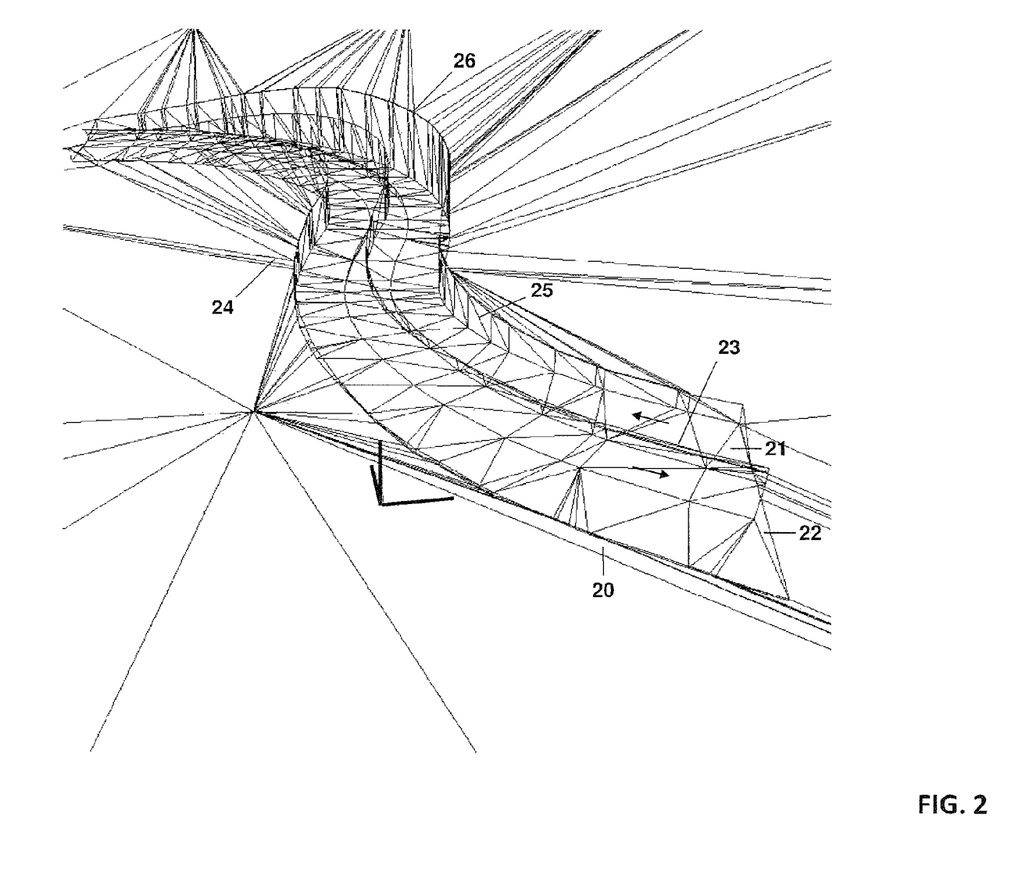
FIG. 2 is a schematic view of a 3-dimensional representation of a tunnel generated with the system of FIG. 1.

FIG. 2 illustrates an example how a tunnel body is generated and embedded into the geographical environment. In FIG. 2 a tunnel body 20 is shown containing two separated lanes 21 and 22 separated by a middle wall 23. The road segment containing the two lanes 21 and 22 is stored in the road network data 11 with an attribute identifying this road segment as a tunnel road segment. The road segment may be constituted of a single road segment, however, the road segment may also be composed of several road segments. The data processing unit 14 then uses the predefined patterns to generate the side walls as shown by walls 24 and 25. As can be seen from FIG. 2 the tunnel walls 24 and 25 are designed in such a way, that they each from the bottom of the tunnel, the height of the road segment tunnel body to the surface of the Earth. This can be deduced from FIG. 2 from the upper end 26 from the side wall 25. As can be deduced by way of example from the right end of the road segment, the tunnel enters the hill at the level of the Earth as the tunnel has no wall 24 at the exit or entrance located on the right side of FIG. 2. As can be seen from FIG. 2 the lane 21 has a driving direction from right to left, whereas lane 22 has the opposite driving direction. For the lane 21 the right tunnel wall is the wall 25, the left tunnel wall being the middle wall 23, whereas for the other driving direction the tunnel wall 24 is the right tunnel wall, the middle wall 23 being the left tunnel wall. The information which wall is the right and left wall for each driving direction is stored in the 3-dimensional representation of the tunnel stored in the database 10. The 3-dimensional representation of the tunnel embedded in its environment can be stored as a 3-dimensional object in the database 10, e.g., in connection with the road network data 11. However, it should be understood that the 3D object representing the tunnel can also be stored in a separate database not shown in FIG. 1.

In the embodiment shown in FIG. 2 the 3D object of the tunnel is generated and shown without a tunnel ceiling. As mentioned above in connection with FIG. 1 the patterns 13 may also contain data allowing to include a tunnel ceiling in this 3D tunnel body. The tunnel ceiling may be added to the embodiment shown in FIG. 2. The tunnel walls may then end at the tunnel ceiling or the tunnel walls may continue to reach the surface of the Earth as shown in FIG. 2, the tunnel ceiling being placed at an appropriate height above the road segments. In the embodiment shown in FIG. 2, the part of the elevation map data located above the tunnel body is omitted in the 3D representation. In another embodiment it is possible that the part of the Earth located above the tunnel body is present in the 3D representation so that the upper surface of the Earth is closed and not represented open as in the embodiment shown in FIG. 2.

Figure 3:
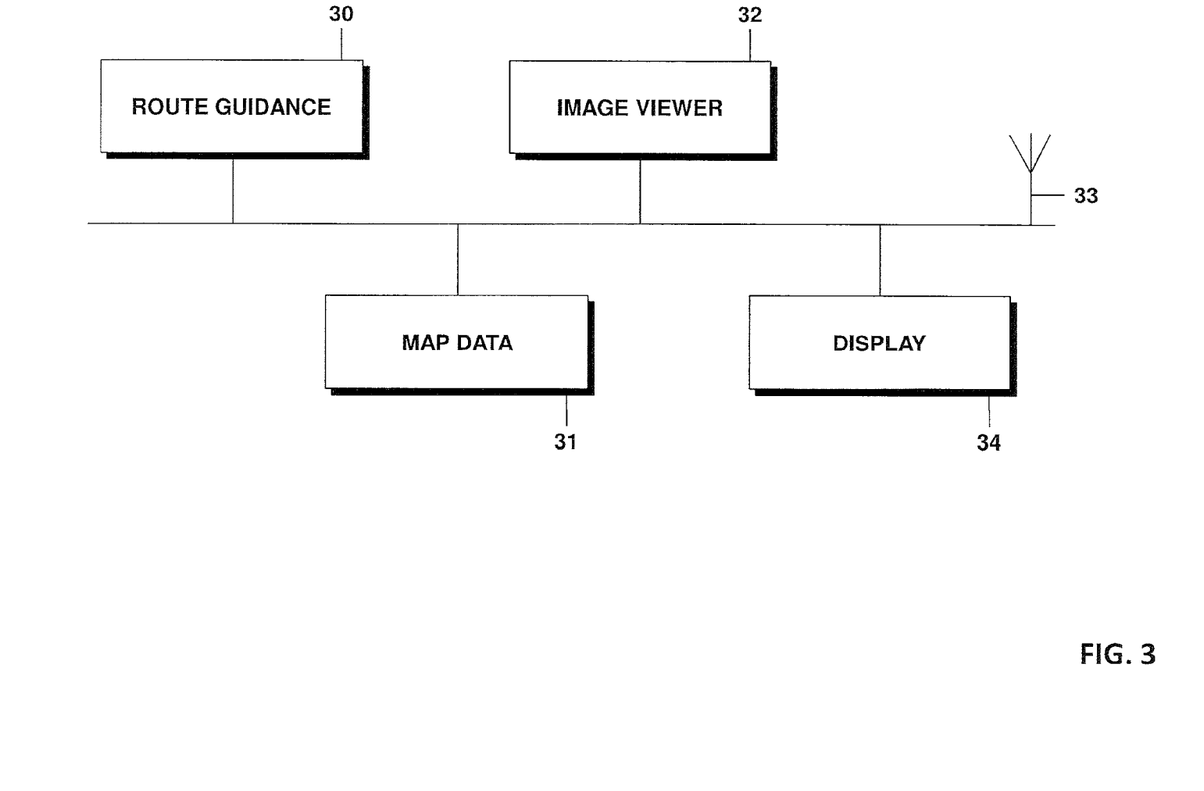
FIG. 3 is a block diagram illustration of a navigation system using the generated 3-dimensional tunnel view for a route guidance.

Referring to FIG. 3, the navigation system is explained in more detail that can be used to use the generated 3D representation of the tunnel for a 3D representation when presenting a 3-dimensional representation of the user's environment to the user. The navigation system shown in FIG. 3 contains a route guidance module 30 that is able to determine a route to a desired destination using map data stored in a map database 31. The map database 31 contains the map data as generated by the system shown in FIG. 1, the map database 31 containing a road network and the stored 3-dimensional objects representing a tunnel. The way the road guidance module 30 calculates a route to a desired destination is known to the skilled person and is not explained in detail. An image viewer 32 generates a 2-dimensional or 3-dimensional representation of the environment of the recommended route. The system also includes a receiver 33 such as for example a GPS receiver. The image generated by the image viewer 32 may be displayed on display 34. The image viewer is able to generate a 3D representation of a geographical region, the image viewer using the stored 3-dimensional dataset to include the tunnel in the generated image. The generated image can be an image as shown in FIG. 2.

It should be understood that the systems shown in FIG. 1 and FIG. 3 may contain further modules and may provide more functions than shown. In the context of this invention only the modules/functions needed for the understanding of the invention are disclosed and explained in more detail. Furthermore, the separate functions of the system are shown as separate entities. It should be understood that the different modules or functions shown in FIGS. 1 and 3 may be incorporated in less modules than shown in the exemplary Figures. Furthermore, the different modules shown in FIGS. 1 and 3 may be implemented by hardware or software or by a combination of hardware and software.

Figure 4:
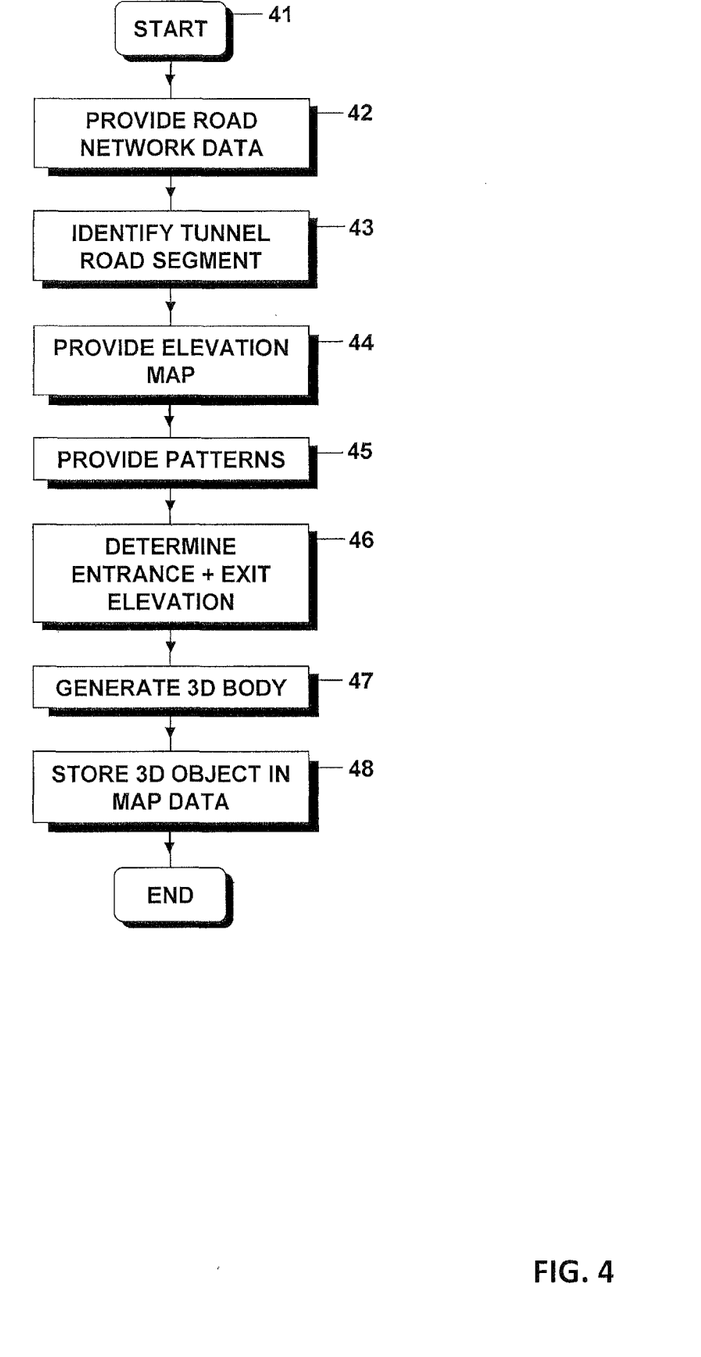
FIG. 4 is a flow-chart illustration of steps for generating the 3-dimensional view of the tunnel according to one embodiment.

FIG. 4 is a flow-chart illustration of steps that may be carried out to generate the 3-dimensional representation of the tunnel. The method starts in step 41 and in step 42 the road network data is provided. The road network data may be a 2D road network data. In the next step 43 a tunnel road segment is identified in the road network data. Furthermore, in step 44 the elevation map data are provided, the elevation map data providing the vertical height of the road network segments. The road network data and the elevation map data may be provided as different datasets, however, they may also be incorporated in one dataset. In step 45 the patterns such as the side walls are provided. With the knowledge of the road network data, the elevation map data and the predefined patterns it is in general possible to generate the 3-dimensional body of the tunnel. In step 46 the entrance and the exit elevation of the tunnel are determined. The entrance and the exit elevation can be used to place the tunnel in the geographical region. In step 47 the 3-dimensional body of the tunnel is generated and embedded in its environment as shown in FIG. 2. The tunnel may be a tunnel having one lane or two lanes per driving direction and can be a tunnel having one driving direction or two driving directions. When the 3-dimensional body of the tunnel is generated it is determined for each driving direction which tunnel wall is the right and which tunnel wall is the left wall. In step 48 the 3-dimensional representation of the tunnel is stored as a 3D object in the map data.

Figure 5:
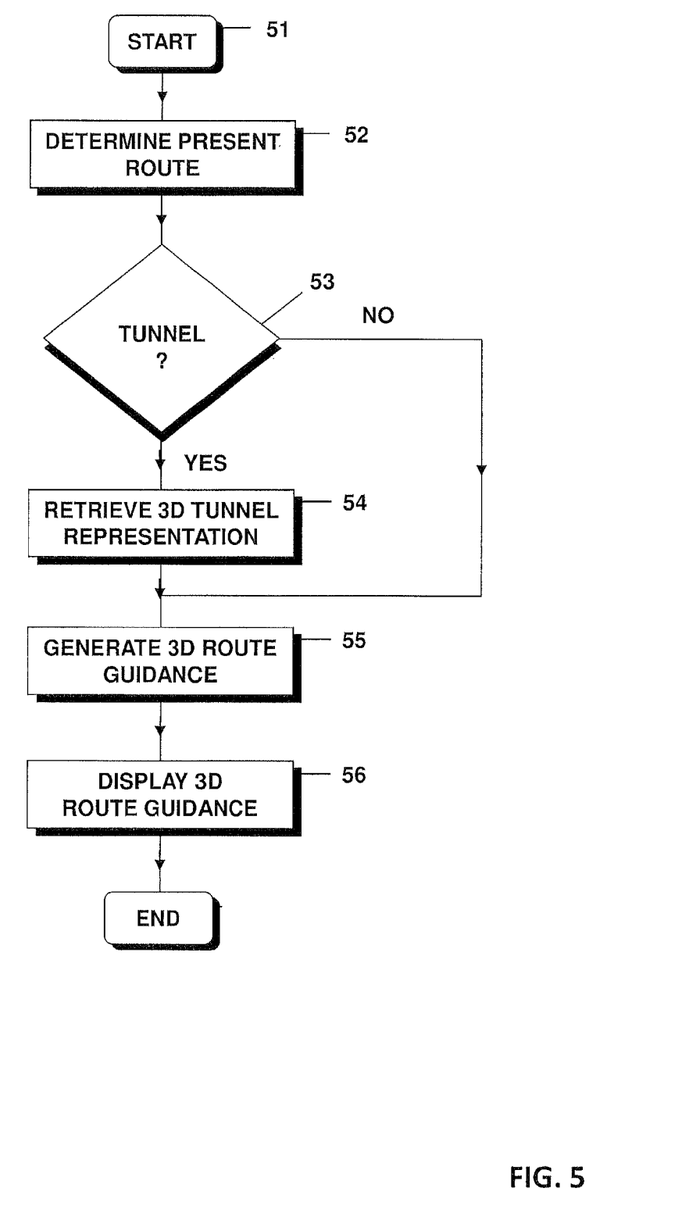
FIG. 5 is a flow chart illustration of steps for displaying a route guidance including the 3-dimensional tunnel representation.

FIG. 5 is a flow-chart illustration of how the 3D object generated and stored by the system shown in FIG. 1 can be used by the navigation system shown in FIG. 3. The method starts in step 51 and in step 52 the present position of the road segment on which the user is located is determined. Furthermore, it is possible that the user has indicated a desired destination. If no destination was indicated, the navigation system normally simply displays the present route section and the upcoming part of the route. In step 53 it is asked whether a road segment for which a 3-dimensional representation should be displayed to the user is a tunnel road segment or not. If it is a tunnel road segment, the 3-dimensional representation of the tunnel is retrieved from the database 31 (step 54) and in step 55 the 3-dimensional route guidance is generated. If the road segment included a tunnel, the tunnel representation will be part of the generated image to be displayed to the user. If in step 53 no tunnel segment was detected, the 3-dimensional route guidance information is generated without the tunnel (step 55). In step 56 the 3-dimensional route guidance information is displayed to the user, the displayed information including a 3-dimensional representation of the tunnel as it is embedded in its environment.

In step 56 the displayed 3D route guidance information normally contains the 3D tunnel. However, if the scale of the display map is such that the displayed region would contain several tunnels, the displayed information may become unclear. In order to avoid this situation, the tunnel may only be displayed when the map scale is smaller than a predefined map scale meaning that the displayed geographical region is smaller than a threshold region. By way of example, when the displayed region contains a region of 1×1 km, the tunnel may be displayed, however, when the display region is a region of 15×15 km, the displaying of the tunnel may be omitted. Thus, the display of the tunnel depends on the level how detailed the information is displayed.

A 3D tunnel may be generated using 2D map data, an elevation map and some general predefined patterns.

Although the present invention has been illustrated and described with respect to several preferred embodiments thereof, various changes, omissions and additions to the form and detail thereof, may be made therein, without departing from the spirit and scope of the invention.

What is claimed is:

1. A method performed in a processing unit, for generating a 3-dimensional representation of a tunnel, the method comprising the steps of:
   providing road network data including a plurality of road segments, at least one road segment being a tunnel road segment, including the information that the at least one road segment is a road segment located in a tunnel;
   identifying the tunnel segment in the road network;
   providing a geographical elevation map including elevation data of the geographical region in which the tunnel road segment is located;
   providing predefined patterns representing predefined parts of a 3-dimensional tunnel body;
   generating the 3-dimensional representation of the tunnel based on the tunnel road segment, the elevation map and the predefined patterns; and
   storing the 3-dimensional representation of the tunnel in connection with the road network as a 3-dimensional object which is located at the geographical position of the tunnel road segment,
   wherein the predefined patterns contain a left tunnel wall and a right tunnel wall, the 3-dimensional representation of the tunnel being generated using the tunnel road segment, the left tunnel wall and the right tunnel wall.

2. The method of claim 1, wherein each tunnel wall contains, at its upper end, a curved surface, the curved surfaces of the left and right tunnel wall building a tunnel ceiling.

3. The method of claim 1, wherein the predefined patterns contain an entrance and/or exit portal of the tunnel, the 3-dimensional representation of the tunnel being generated using the entrance and/or exit portal.

4. The method of claim 1, wherein the 3-dimensional representation is generated by generating a 3-dimensional tunnel body including the tunnel road segment and the right and left tunnel walls, the tunnel body being embedded in the elevation map below a surface of the Earth.

5. The method of claim 4, wherein the 3-dimensional tunnel body is generated in such a way that a tunnel ceiling is omitted from the 3-dimensional body, the left and right tunnel side walls extending from the tunnel road segment to the surface of the Earth.

6. The method of claim 4, wherein the 3-dimensional tunnel body comprises a tunnel ceiling.

7. The method of claim 4, wherein the position of the tunnel body below the surface of the Earth is determined by elevation data of a tunnel entrance and of a tunnel exit.

8. The method of claim 1, further comprising the step of identifying the right and left tunnel wall for each driving direction in the tunnel and storing the identified left and right tunnel walls for each driving direction in the 3-dimensional representation of the tunnel.

9. A system configured to generate a 3-dimensional representation of a tunnel, the system comprising:
   a database containing road network data including a plurality of road segments, at least one road segment being a tunnel road segment including the information that the at least one road segment is a road segment located in a tunnel, the database furthermore containing an elevation map including elevation data of the geographical region in which the tunnel road segment is located, the database containing predefined patterns representing predefined parts of a 3-dimensional tunnel body; and
   a data processing unit configured to identify the tunnel road segment in the road network and configured to generate the 3-dimensional representation of the tunnel based on the tunnel road segment, the elevation map, and the predefined patterns, and configured to store the 3-dimensional representation of the tunnel in the database in connection with the road network as a 3-dimensional object which is located at the geographical position of the tunnel road segment,
   wherein the predefined patterns contain a tunnel wall, the data processing unit being configured to generate the 3-dimensional representation of the tunnel being generated using the tunnel road segment, the tunnel wall and the tunnel wall.

10. The system of claim 9, wherein the data processing unit generates the 3-dimensional representation of the tunnel by generating a 3-dimensional tunnel body including the tunnel road segment and the tunnel walls, the tunnel body being embedded in the elevation map below a surface of the Earth.

11. The system of claim 10, wherein the data processing unit generates the 3-dimensional body in such a way that a tunnel ceiling is omitted from the 3-dimensional body, the side walls extending from the tunnel road segment to the surface of the Earth.

12. The system of claim 10, wherein the data processing unit embeds the tunnel body below the surface of the Earth in such a way that the position of the tunnel body image below the surface of the Earth image is determined by elevation data of a tunnel entrance and of a tunnel exit.

13. The system of claim 9, wherein the data processing unit is configured to identify a right and left tunnel wall for each driving direction in the tunnel and configured to store the identified left and right tunnel walls for each driving direction in the 3-dimensional representation of the tunnel.

14. A method performed in a processing unit, for displaying a 3-dimensional route guidance information to a user of a navigation system, the method comprising the steps of:
   determining a route along which the user is moving;
   identifying a road segment as a tunnel road segment, wherein a road segment is a tunnel road segment when it includes the information that the road segment is located in a tunnel;
   generating the 3-dimensional representation of the tunnel, the 3-dimensional representation of the tunnel being generated based on the tunnel road segment, a geographical elevation map including elevation data of the geographical region in which the tunnel road segment is located, and predefined patterns representing predefined parts of a 3-dimensional tunnel body; and displaying a 3-dimensional route guidance information including a 3-dimensional representation of at least a section of the route and including the 3-dimensional representation of the tunnel, wherein the predefined patterns contain a tunnel wall and a tunnel wall, the 3-dimensional representation of the tunnel being generated using the tunnel road segment and the tunnel wall.

15. The method of claim 14, wherein the 3-dimensional representation of the tunnel is generated by retrieving from a database the 3-dimensional representation of the tunnel as a 3-dimensional object stored in the database.

16. The method of claim 14, wherein the 3-dimensional representation of the tunnel is only shown in the 3-dimensional route guidance information when a geographical region displayed as 3-dimensional route guidance information is smaller than a predefined threshold region.

17. A navigation system configured to display 3-dimensional route guidance recommendations to a user, the system comprising:

a route guiding module configured to determine a route along which the user is moving and configured to identify a road segment as a tunnel road segment, wherein a road segment is a tunnel road segment when it includes the information that the road segment is located in a tunnel;

an image viewer configured to generate the 3-dimensional representation of the tunnel, the 3-dimensional representation of the tunnel being generated based on the tunnel road segment, the elevation map, and predefined patterns representing predefined parts of a 3-dimensional tunnel body; and a display configured to display the 3-dimensional route guidance information including a 3-dimensional representation of at least a section of the route and including the 3-dimensional representation of the tunnel, wherein the predefined patterns contain a tunnel wall, the data processing unit being configured to generate the 3-dimensional representation of the tunnel being generated using the tunnel road segment, the tunnel wall and the tunnel wall.

\* \* \* \* \*